US010382707B2

(12) United States Patent
Totsuka et al.

(10) Patent No.: US 10,382,707 B2
(45) Date of Patent: Aug. 13, 2019

(54) IMAGING DEVICE

(71) Applicant: CANON KABUSHIKI KAISHA, Tokyo (JP)

(72) Inventors: Hirofumi Totsuka, Fujisawa (JP); Katsuhito Sakurai, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 89 days.

(21) Appl. No.: 15/712,572

(22) Filed: Sep. 22, 2017

(65) Prior Publication Data

US 2018/0139396 A1 May 17, 2018

(30) Foreign Application Priority Data

Nov. 15, 2016 (JP) ................................ 2016-222225

(51) Int. Cl.

| | |
|---|---|
| ***H04N 5/222*** | (2006.01) |
| ***H04N 5/30*** | (2006.01) |
| ***H04N 5/374*** | (2011.01) |
| ***H04N 5/378*** | (2011.01) |
| ***H04N 5/335*** | (2011.01) |
| ***H04N 5/225*** | (2006.01) |
| ***H01L 31/00*** | (2006.01) |
| ***H04N 5/3745*** | (2011.01) |

(52) U.S. Cl.

CPC ............... *H04N 5/30* (2013.01); *H04N 5/222* (2013.01); *H04N 5/378* (2013.01); *H04N 5/37455* (2013.01)

(58) Field of Classification Search

CPC ...... H04N 5/222; H04N 5/30; H04N 5/37455; H04N 5/378; H04N 5/335; H04N 5/225; H04N 3/00; H01L 31/00

USPC ............ 348/207.99, 308, 294, 208.1, 230.1, 348/222.1, 300, 302, 306, 350; 250/208.1; 257/291, 292, 300; 327/100, 327/101, 102, 103, 104, 105, 106, 107, 327/108; 341/155, 161, 163, 185

See application file for complete search history.

(56) References Cited

U.S. PATENT DOCUMENTS

| | | | | |
|---|---|---|---|---|
| 6,188,094 | B1 | 2/2001 | Kochi et al. | 257/232 |
| 6,605,850 | B1 | 8/2003 | Kochi et al. | 257/431 |
| 6,670,990 | B1 | 12/2003 | Kochi et al. | 348/310 |
| 6,946,637 | B2 | 9/2005 | Kochi et al. | 250/208.1 |
| 6,960,751 | B2 | 11/2005 | Hiyama et al. | 250/208.1 |

(Continued)

OTHER PUBLICATIONS

Masahide Goto et al., "Three-Dimensional Integrated CMOS Image Sensors with Pixel-Parallel Signal Processors", Technical Report of the Institute of Video Information Media, Mar. 2015, vol. 39, No. 16, pp. 5-8.

*Primary Examiner* — Marly S Camargo

(74) *Attorney, Agent, or Firm* — Venable LLP

(57) ABSTRACT

According to an aspect of the present invention, there is provided an imaging device including: a plurality of pixels, each pixel including a photoelectric conversion unit that photoelectrically converts received light, a read node in which a signal charge generated in the photoelectric conversion unit is accumulated, and a first readout circuit that performs analog-to-digital conversion to convert a signal based on the signal charge accumulated in the read node into a digital signal; and a second readout circuit that reads a signal based on the signal charge, the signal having a smaller amplitude than a resolution of the analog-to-digital conversion of the first readout circuit.

16 Claims, 10 Drawing Sheets

(56) References Cited

U.S. PATENT DOCUMENTS 7,110,030 B1 9/2006 Kochi et al. .................. 348/308
7,187,052 B2 3/2007 Okita et al. .................. 257/444
7,429,764 B2 9/2008 Koizumi et al. .............. 257/292
7,466,003 B2 12/2008 Ueno et al. .................. 257/462
7,531,885 B2 5/2009 Okita et al. .................. 257/444
7,538,810 B2 5/2009 Koizumi et al. .............. 348/308
7,547,871 B2 6/2009 Hiyama et al. ............ 250/208.1
7,633,540 B2 12/2009 Totsuka ........................ 348/294
7,679,658 B2 3/2010 Sakurai et al. ............... 348/243
7,872,286 B2 1/2011 Okita et al. .................. 257/291
7,990,440 B2 8/2011 Kobayashi et al. .......... 348/241
8,084,729 B2 12/2011 Kato et al. ................. 250/208.1
8,089,545 B2 1/2012 Koizumi et al. .............. 348/308
8,154,639 B2 4/2012 Kato et al. .................... 348/302
8,189,081 B2 5/2012 Totsuka ........................ 348/294
8,309,898 B2 11/2012 Kato et al. ................. 250/208.1
8,411,185 B2 4/2013 Totsuka ........................ 348/308
8,421,894 B2 4/2013 Koizumi et al. .............. 348/308
8,553,118 B2 10/2013 Saito et al. .................. 348/300
8,605,182 B2 12/2013 Totsuka et al. ............... 348/308
8,614,756 B2* 12/2013 Yoshida ................. H04N 5/335
348/300
8,883,526 B2 11/2014 Okita et al. ..................... 438/24
8,937,672 B2 1/2015 Totsuka et al. ............... 348/302
9,013,765 B2 4/2015 Totsuka ........................ 358/482
9,282,263 B2 3/2016 Totsuka ................. H04N 5/376
9,332,202 B2 5/2016 Totsuka ............. H04N 5/37455
9,337,222 B2 5/2016 Saito et al. ....... H04L 27/14609
9,350,958 B2 5/2016 Totsuka et al. ......... H03M 1/00
9,716,849 B2 7/2017 Kobayashi et al. .........................
H01L 27/14612
9,787,932 B2 10/2017 Totsuka et al. ...... H04N 5/3765
2008/0258042 A1* 10/2008 Krymski ................. H01L 27/00
250/208.1
2009/0141157 A1* 6/2009 Kobayashi ............. H04N 5/335
348/308
2012/0312963 A1* 12/2012 Storm ................... H01L 27/046
350/208.1
2013/0181118 A1 7/2013 Koizumi et al. ........... 250/208.1
2014/0160331 A1* 6/2014 Murakami ............. H04N 5/335
348/300
2015/0244963 A1* 8/2015 Totsuka ............. H04N 5/37455
348/308
2015/0281614 A1 10/2015 Yoshida et al. ...... H04N 5/3745
2015/0281616 A1* 10/2015 Muto ..................... H04N 5/378
348/322
2015/0365616 A1* 12/2015 Yoshida ................. H04N 5/378
348/308
2017/0078607 A1 3/2017 Totsuka et al. .... H04N 5/37452
2017/0289478 A1 10/2017 Kobayashi et al. .........................
H01L 27/14603

* cited by examiner 101
106
VRAMP
CLK
103
100
VAL
VDL
102
104
105 t40
t41
t42
t43
t44
t45
t46
t47
t48
ACCUMULATION PERIOD
FIRST AD
SECOND AD (S)
SECOND AD (N)
THIRD AD (S)
RES
TX
FD
VREF
NODE B
COUNTER 202
0
1
2
3
4
AD1
SEL
VRAMP
VAL
COUNTER 213
AD2 (S)
AD2 (N)
AD3 (S)

IMAGING DEVICE

BACKGROUND OF THE INVENTION

Field of the Invention

The present invention relates to a technique for improving gradation of AD conversion in imaging devices.

Description of the Related Art

A structure in which an analog-to-digital (AD) conversion circuit is provided in each pixel of an imaging device including a plurality of pixels each including a photodiode is disclosed in GOTO Masahide, and eight others, "Three-Dimensional Integrated CMOS Image Sensors with Pixel-Parallel Signal Processors" Technical Report of The Institute of Video Information Media, March 2015, Vol. 39, No. 16, pp. 5-8, for example. In the AD conversion circuit disclosed in GOTO Masahide, and eight others, "Three-Dimensional Integrated CMOS Image Sensors with Pixel-Parallel Signal Processors" Technical Report of The Institute of Video Information Media, March 2015, Vol. 39, No. 16, pp. 5-8, when a voltage based on a signal charge generated in a photodiode exceeds a threshold voltage of an inverter, the output voltage of the inverter is inverted and the signal charge of the photodiode is reset. Therefore, it is possible to obtain an AD conversion value of a signal based on the amount of incident light by counting the number of times the output voltage of the inverter is inverted. According to such a configuration, since it is possible to AD-convert a signal based on a signal charge that exceeds an accumulation capacity of a pixel, it is possible to image a subject having a high brightness.

However, in the AD conversion circuit disclosed in GOTO Masahide, and eight others, "Three-Dimensional Integrated CMOS Image Sensors with Pixel-Parallel Signal Processors" Technical Report of The Institute of Video Information Media, March 2015, Vol. 39, No. 16, pp. 5-8, when a subject has a low brightness, for example, a voltage based on a signal charge generated in a photodiode may sometimes do not reach a threshold voltage of an inverter in a predetermined accumulation period. In this case, the gradation on a low brightness side of the subject decreases greatly. Therefore, an object of the present invention is to provide an imaging device of which the gradation in a low brightness region is improved.

SUMMARY OF THE INVENTION

According to an aspect of the present invention, there is provided an imaging device including: a plurality of pixels, each pixel including a photoelectric conversion unit that photoelectrically converts received light, a read node in which a signal charge generated in the photoelectric conversion unit is accumulated, and a first readout circuit that performs analog-to-digital conversion to convert a signal based on the signal charge accumulated in the read node into a digital signal; and a second readout circuit that reads a signal based on the signal charge, the signal having a smaller amplitude than a resolution of the analog-to-digital conversion of the first readout circuit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
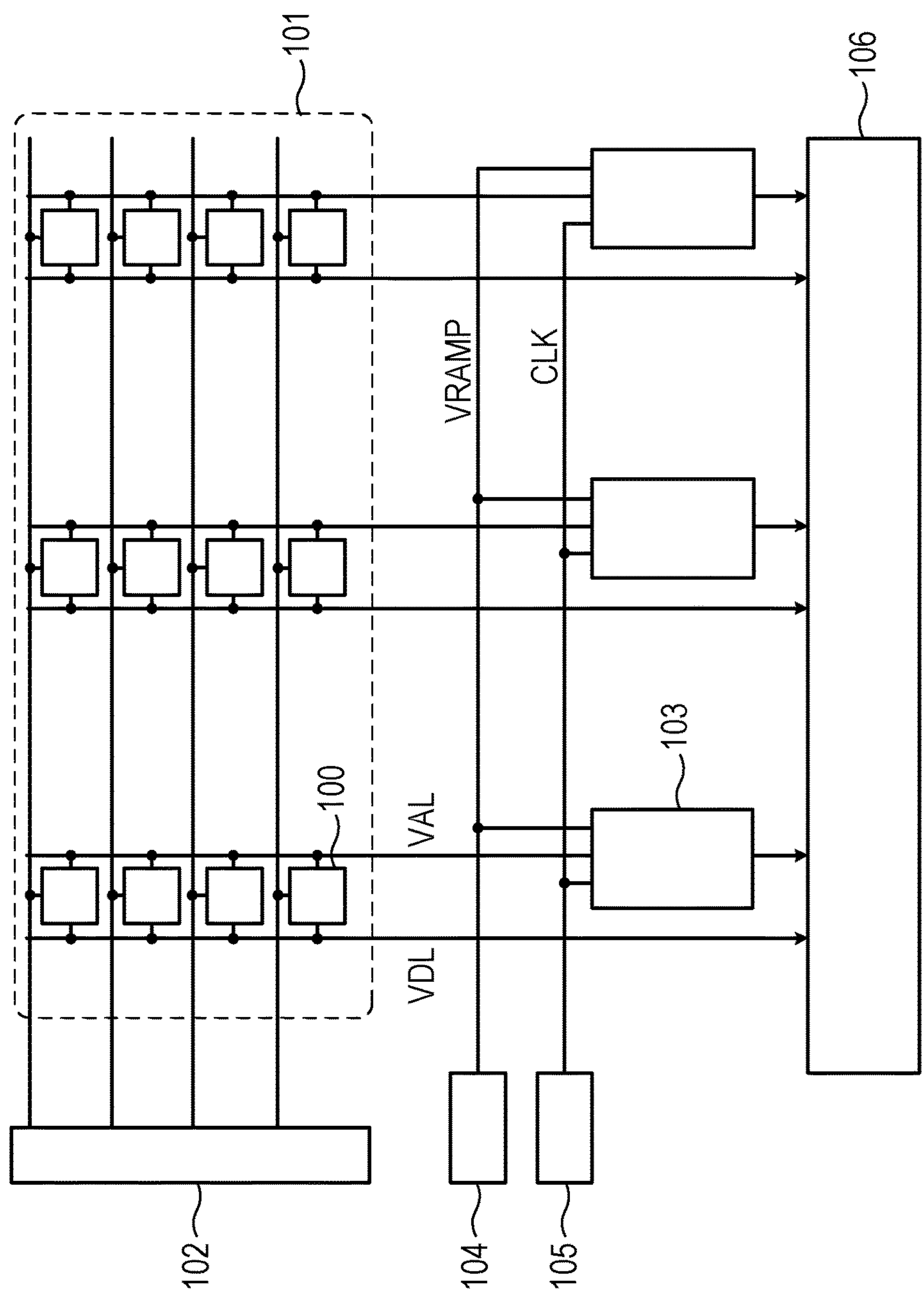
FIG. 1 is a schematic diagram illustrating a configuration of an imaging device according to a first embodiment.

FIG. 1 is a schematic diagram illustrating a configuration of an imaging device according to a first embodiment. An imaging device of the present embodiment includes a pixel array 101, a vertical scanning circuit 102, a second readout circuit 103, a reference signal generation circuit 104, and a clock generation circuit 105.

A plurality of pixels 100 are disposed in the pixel array 101 in a matrix form. The plurality of pixels 100 is driven according to a control signal output from the vertical scanning circuit 102 to perform an imaging operation. The pixel 100 outputs an analog signal via an analog output line VAL provided in each column of the pixel array 101. Moreover, each pixel 100 has a first readout circuit as will be described later and outputs a digital signal via a digital output line VDL provided in each column of the pixel array 101. The analog output line VAL and the digital output line VDL may not necessarily be provided in each column of the pixel array 101 but may be provided in common to the plurality of pixels 100, for example.

The second readout circuit 103 reads an analog signal output to the analog output line VAL. The reference signal generation circuit 104 supplies a reference signal VRAMP referred to when the second readout circuit 103 performs AD conversion. The clock generation circuit 105 supplies a clock signal CLK to the second readout circuit 103. A signal processing unit 106 calculates a final AD conversion value on the basis of the digital signal output from the pixel 100 via the digital output line VDL and the digital signal output from the second readout circuit 103.

Figure 2:
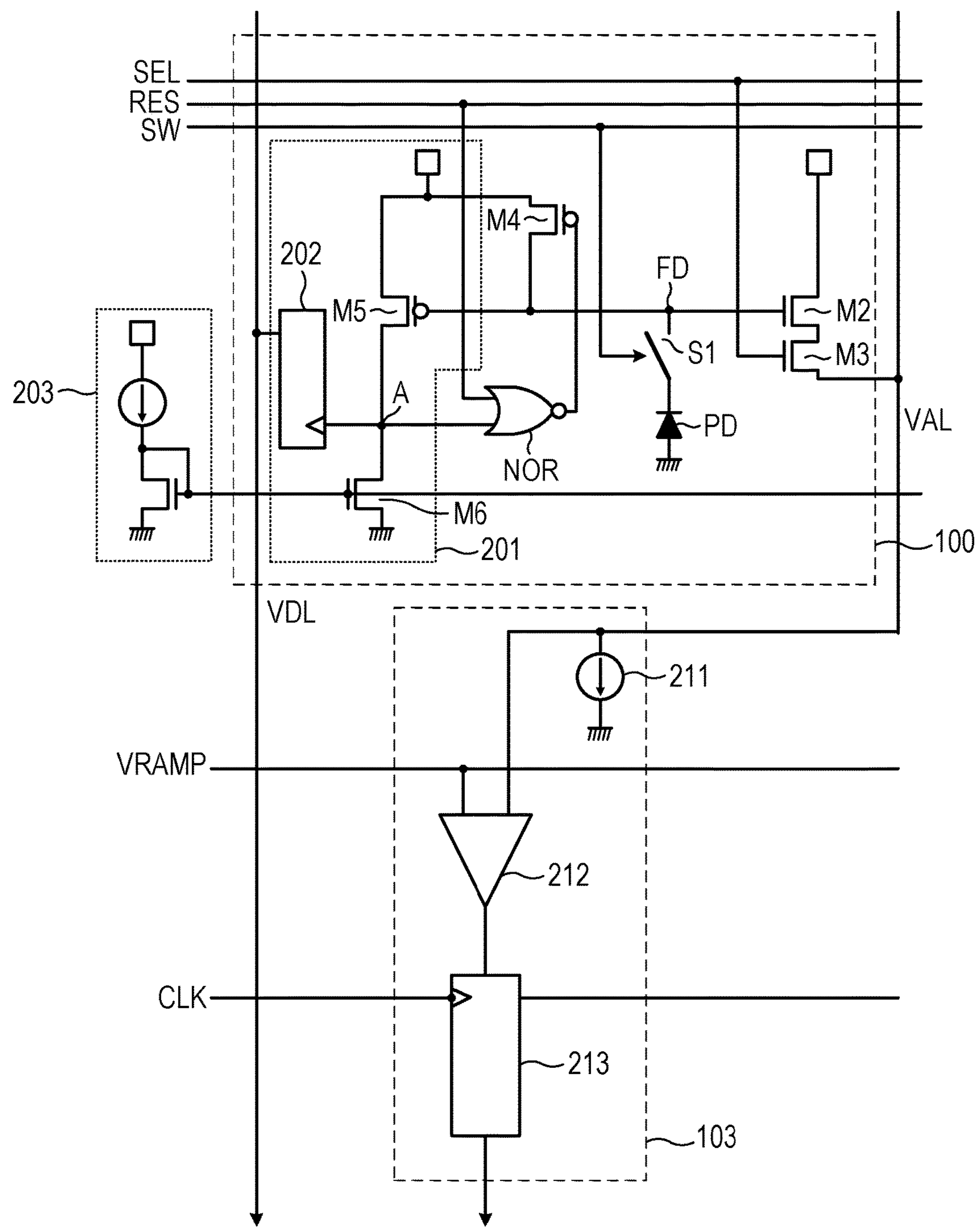
FIG. 2 is a schematic diagram illustrating a configuration of a pixel and a second readout circuit of an imaging device according to the first embodiment.

FIG. 2 is a schematic diagram illustrating a configuration of the pixel 100 and the second readout circuit 103 of the imaging device according to the first embodiment. The pixel 100 of the present embodiment includes a photoelectric conversion unit PD, a first switch S1, a readout transistor M2, a selection transistor M3, a reset transistor M4, a negative logical sum gate NOR, and a first readout circuit 201. Control signals SW, SEL, and RES are output from the vertical scanning circuit 102 and are connected to the first switch S1, the selection transistor M3, and the negative logical sum gate NOR in each of the pixels 100 on the same row.

The photoelectric conversion unit PD photoelectrically converts received light. A signal charge generated in the photoelectric conversion unit PD is transferred to a read node FD. Here, the read node FD means a floating diffusion region formed in a connection point of the three elements, the photoelectric conversion unit PD, the readout transistor M2, and the first readout circuit 201. In the pixel 100 of the present embodiment illustrated in FIG. 2, a first switch S1 is further provided between the photoelectric conversion unit PD and the read node FD. When the first switch S1 is in a conduction state, the signal charge generated in the photoelectric conversion unit PD is transferred to and accumulated in the read node FD. However, when the first switch S1 is in a non-conduction state, the signal charge generated in the photoelectric conversion unit PD is accumulated in the photoelectric conversion unit PD.

The readout transistor M2 amplifies a signal based on the signal charge transferred to the read node FD. The selection transistor M3 is controlled according to the control signal SEL to switch the connection between the analog output line VAL and an output terminal of the readout transistor M2. The reset transistor M4 resets the signal charge transferred to the read node FD.

The first readout circuit 201 includes a common-source amplifier including a transistor M5 and a transistor M6 and a first counter 202. A current mirror circuit 203 is connected to the common-source amplifier. As illustrated in FIG. 2, the current mirror circuit 203 may be connected in common to the pixels 100 on the same row or may be connected in common to all pixels 100.

The common-source amplifier inverts an output when a signal based on the signal charge transferred to and accumulated in the read node FD exceeds a predetermined threshold. The first counter 202 counts the number of times the output of the common-source amplifier is inverted. The first readout circuit 201 resets the signal charge of the read node FD using the reset transistor M4 when the output of a first comparator circuit is inverted. The value counted by the first counter 202 is output via the digital output line VDL.

The second readout circuit 103 includes a current source 211, a second comparator circuit 212, and a second counter 213. The second readout circuit 103 reads a signal based on a signal charge transferred to and accumulated in the read node FD via the readout transistor M2 and the selection transistor M3 of the pixel 100. The readout transistor M2 and the selection transistor M3 of the pixel 100 form a current mirror circuit together with the current source 211. Due to this, in the following description, the readout transistor M2 and the selection transistor M3 may be a portion of the configuration of the second readout circuit 103. The second comparator circuit 212 compares the magnitudes of the signal output to the analog output line VAL and the reference signal VRAMP. The second counter 213 measures the duration of a period elapsed until the output of the second comparator circuit 212 is inverted by counting the clock signals CLK.

Figure 3:
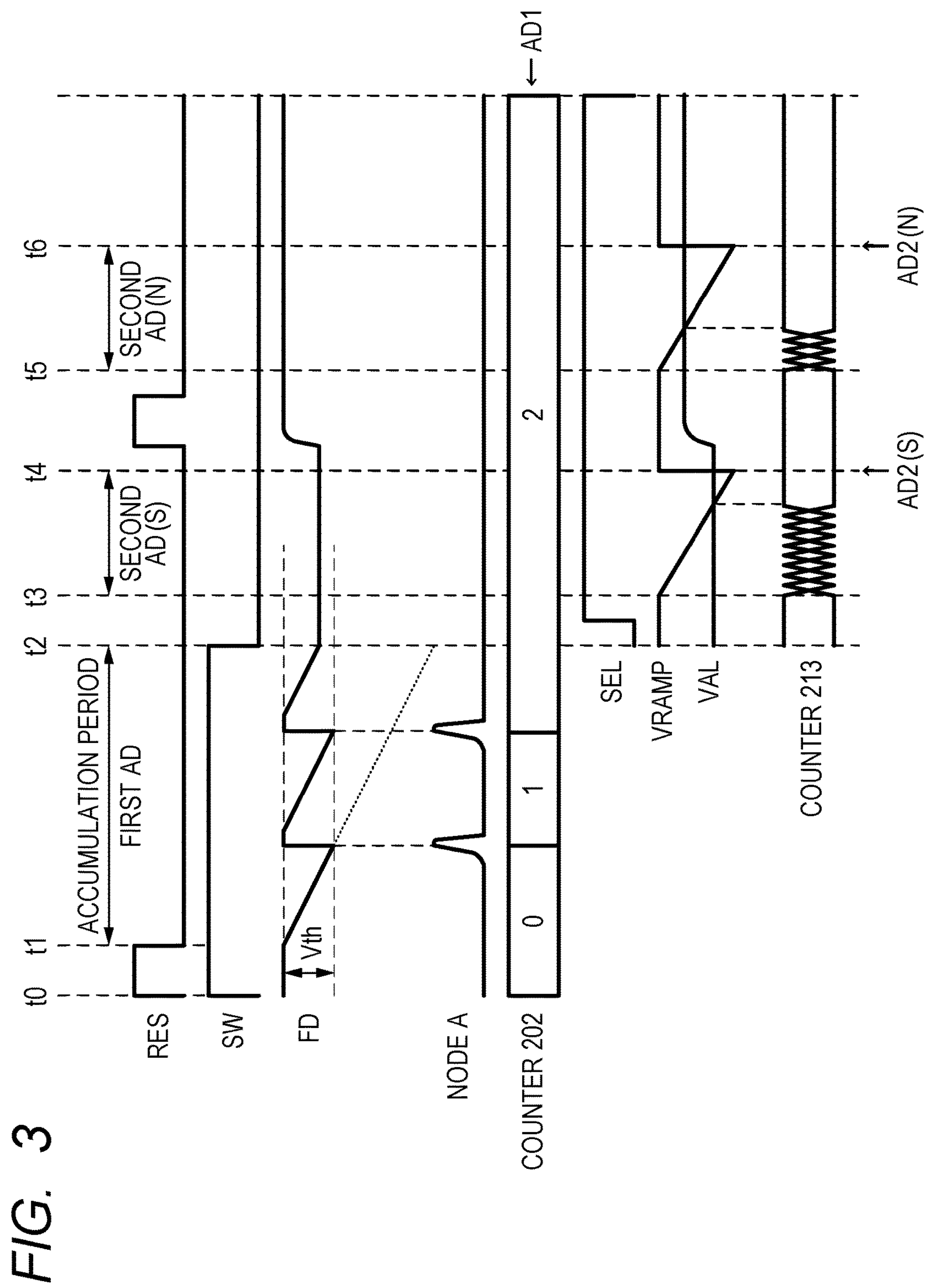
FIG. 3 is a timing chart illustrating a method of controlling the imaging device according to the first embodiment.

FIG. 3 is a timing chart illustrating a method of controlling the imaging device according to the first embodiment. The imaging device of the present embodiment is controlled according to the control signals RES, SW, and SEL output from the vertical scanning circuit 102. At time t0, when the control signal RES and the control signal SW are changed to Hi, the reset transistor M4 and the first switch S1 enter a conduction state and the signal charge of the read node FD and the photoelectric conversion unit PD is reset. In this way, a gate-drain voltage of the transistor M5 becomes 0 V. Current does not flow into the transistor M5 and the voltage of the node A between the transistor M5 and the first counter 202 is approximately 0 V.

At time t1, when the control signal RES is changed to Lo, accumulation of the signal charge photoelectrically converted by the photoelectric conversion unit PD starts. The signal charge generated in the photoelectric conversion unit PD is accumulated in the photoelectric conversion unit PD and is transferred to the read node FD since the first switch S1 is in the conduction state. As the amount of the charge transferred to and accumulated in the read node FD increases, the voltage of the read node FD decreases. The slope of a change with time in the voltage of the read node FD is determined on the basis of an increase rate of the amount of the signal charge and the floating capacitance of the read node FD. The larger the amount of light received by the pixel 100, the more abrupt the slope of the change with time in the voltage of the read node FD. As the voltage of the read node FD decreases, the current flowing from the transistor M5 to the node A increases.

When the current flowing to the node A increases up to the current amount flowing through the transistor M6, the voltage of the node A increases. As a result, the voltage of the node A exceeds the threshold of the negative logical sum gate NOR and the signal charge of the read node FD is reset by the reset transistor M4. At the same time, the count value of the first counter 202 that counts the rising or falling edge of the voltage of the node A changes from "0" to "1".

Here, the current amount flowing to the transistor M6 is determined by the current source of the current mirror circuit 203. Therefore, by changing the current amount of the current source of the current mirror circuit 203, the threshold voltage Vth at which the read node FD is reset can be set to a desired value. In this way, a common-source amplifier formed of the transistors M5 and M6 operates as a comparator circuit (hereinafter referred to as a "first comparator circuit") that compares the signal based on the signal charge accumulated in the read node FD and the threshold voltage Vth.

The first comparator circuit inverts its output when the signal based on the signal charge of the read node FD exceeds a predetermined threshold voltage and resets the signal charge of the read node FD. In this way, when the voltage of the node A decreases, the reset transistor M4 enters a non-conduction state and the accumulation of signal charge in the photoelectric conversion unit PD restarts. In this case, the negative logical sum gate NOR illustrated in FIG. 2 functions as a reset unit that resets the signal charge accumulated in the read node using the reset transistor M4. In FIG. 2, the negative logical sum gate NOR is not included in the first readout circuit 201. However, the first readout circuit 201 may include the negative logical sum gate NOR. Furthermore, the first readout circuit 201 may include the reset transistor M4.

In a predetermined accumulation period t1 to t2 having a predetermined duration, the number of times the read node FD is reset is counted using the first counter 202 whereby the signal based on the signal charge accumulated in the accumulation period t1 to t2 is AD-converted. The AD conversion value is held in the first counter 202. Subsequently, at time t2, the control signal SW is changed to Lo, the first switch S1 enters a non-conduction state.

As a result, the signal charge at time t2 is held in the read node FD, and the charge generated in the photoelectric conversion unit PD after time t2 is not transferred to the read node FD but is accumulated in the photoelectric conversion unit PD. At time t2, the charge which is not AD-converted by the first readout circuit 201 and is held in the read node FD is a signal component that is smaller than the AD conversion resolution of the first readout circuit 201.

In this manner, the first readout circuit 201 performs AD conversion in the accumulation period t1 to t2 in which the signal charge generated in the photoelectric conversion unit PD is transferred to and accumulated in the read node FD. In the following description, the AD conversion by the first readout circuit 201 will be referred to as first AD conversion, and a readout result by the first AD conversion will be referred to as AD1. For example, in FIG. 3, AD1=2. Although the first AD conversion operation in the accumulation period t1 to t2 is performed simultaneously for all pixels of the pixel array 101 or in a row-sequential manner, the operation after time t2 to be described later is performed in a row-sequential manner.

After time t2, when the control signal SEL is changed to Hi, the selection transistor M3 enters a conduction state, and a signal based on the signal charge held in the read node FD is output via the analog output line VAL by the readout transistor M2. At time t3, the magnitude of the reference signal VRAMP starts changing with time at a constant slope. At the same time, the clock signal CLK is input to the second counter 213 and the second counter 213 starts counting the number of clock edges.

In a period t3 to t4, when the voltage of the reference signal VRAMP decreases to be smaller than the voltage of the signal output to the analog output line VAL, the output of the second comparator circuit 212 is inverted and a counting operation of the second counter 213 stops. As a result, the count value when the output of the second comparator circuit 212 is inverted is held in the second counter 213. The reference signal VRAMP is not limited to a ramp signal of which the magnitude changes with time at a predetermined slope but may be a signal of which the magnitude changes with time.

In this manner, the second readout circuit 103 AD-converts a signal component smaller than the AD conversion resolution of the first readout circuit 201 held in the read node FD in a period t3 to t4. In the following description, the AD conversion by the second readout circuit 103 in the period t3 to t4 will be referred to as second AD(S) conversion, and a readout result of the second AD(S) conversion will be referred to as AD2(S).

Subsequently, at time t4, when the second AD(S) conversion ends, the control signal RES is temporarily changed to Hi and is then returned to Lo in a period t4 to t5, and the signal charge of the read node FD is reset. After that, in a period t5 to t6, a reset level of the read node FD is AD-converted by the second readout circuit 103 similarly to the second AD(S) conversion. AD conversion of the second readout circuit 103 in a period t5 to t6 will be referred to as second AD(N) conversion, and a readout result of the second AD (N) conversion will be referred to as AD2(N).

An AD conversion value of a signal component smaller than the resolution of the first readout circuit 201 held in the read node FD is obtained by subtracting AD2(N) from AD2(S). AD conversion of the second readout circuit 103 in a period t3 to t6 will be referred to second AD conversion, and a readout result of the second AD conversion will be referred to as AD2.

The largest amplitude (a difference between maximum and minimum values) of the reference signal VRAMP in the second AD(S) conversion period t3 to t4 is preferably equal to or larger than a threshold voltage so as to be able to cover a range smaller than the first AD conversion resolution of the first readout circuit 201. The largest amplitude of the reference signal VRAMP of the second AD(N) conversion period t5 to t6 may be smaller than the largest amplitude of the reference signal VRAMP in the second AD(S) conversion period t3 to t4.

The readout result AD1 obtained by the first AD conversion and the readout result AD2 obtained by the second AD conversion are transferred to the signal processing unit 106 in the subsequent stage. The signal processing unit 106 calculates a final AD conversion value AD on the basis of the output of the first readout circuit 201 and the output value from the second readout circuit 103 according to Equation (1). Here, a readout result AD1U when the voltage corresponding to the threshold voltage Vth was AD-converted by the second readout circuit 103 was used.

$$AD = AD1 \times AD1U + AD2 \tag{1}$$

As illustrated in FIG. 3, in an accumulation period t1 to t2, the read node FD enters a reset state in a predetermined period for a plurality of number of times. In this reset period, a portion of the signal charge which is to be accumulated is discharged via the reset transistor M4. Therefore, the readout result AD1 of the first AD conversion is decreased by the amount of the discharged signal charge in a period Tres in which the read node FD is in the reset state. In order to correct this error, the readout result AD1 of the first AD conversion may be corrected by the signal processing unit 106 according to Equation (2) below, for example. Here, a correction value of the readout result AD1 of the first AD conversion is defined as AD1', and the duration of the reset period in one accumulation period Tacc is defined as Tres.

$$AD1' = AD1 \times Tacc / (Tacc - Tres \times AD1) \tag{2}$$

As described above, in the imaging device of the present embodiment, the first readout circuit that AD-converts a signal based on a signal charge accumulated in the read node is provided inside the pixel. Moreover, the second readout circuit that reads a signal based on the signal charge, having an amplitude smaller than analog-to-digital conversion resolution of the first readout circuit is provided outside the pixel. Due to this configuration, since a signal component smaller than the resolution of the first readout circuit can be read by the second readout circuit, it is possible to provide an imaging device in which the gradation of a low-brightness image is improved.

The first readout circuit 201 is not limited to the configuration illustrated in FIG. 2, but a plurality of inverters as illustrated in FIG. 3 disclosed in GOTO Masahide, and eight others, "Three-Dimensional Integrated CMOS Image Sensors with Pixel-Parallel Signal Processors" Technical Report of The Institute of Video Information Media, March 2015, Vol. 39, No. 16, pp. 5-8, for example, may be combined to form the first readout circuit 201. Moreover, the second readout circuit 103 may have a circuit configuration which performs a slope-type AD conversion as well as the reference signal generation circuit 104 and the clock generation circuit 105 illustrated in FIG. 1 and may have a configuration which performs other AD conversion methods such as a successive approximation-type AD conversion or cyclic AD conversion.

The second readout circuit 103 does not necessarily AD-convert a signal based on the signal charge, but instead of this, the signal processing unit 106 may perform AD conversion on the basis of an output value from the second readout circuit 103. Regardless of whether the second readout circuit 103 outputs a digital or analog value, the resolution of reading signals from the pixel 100 may be smaller than that of the first readout circuit. The signal processing unit 106 may be provided inside the imaging device and may be provided outside the imaging device. Moreover, a mechanical shutter that opens and closes at the same timing as the control signal SW may be provided outside the imaging device instead of the first switch S1.

Second Embodiment

Figure 4:
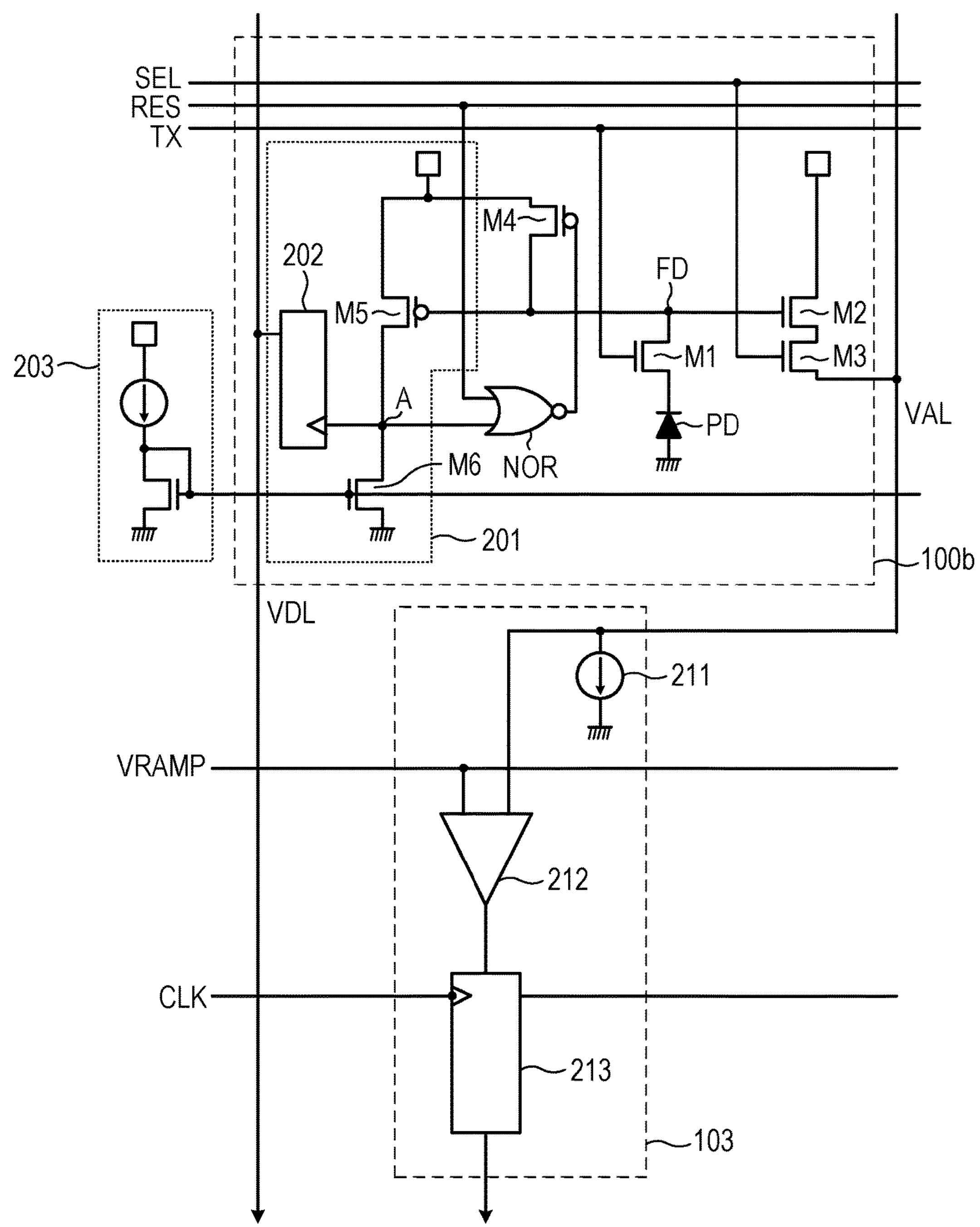
FIG. 4 is a schematic diagram illustrating a configuration of a pixel and a second readout circuit of an imaging device according to a second embodiment.

FIG. 4 is a schematic diagram illustrating a configuration of a pixel 100*b* and a second readout circuit 103 of an imaging device according to a second embodiment. The imaging device of the present embodiment illustrated in FIG. 4 is different from the imaging device of the first embodiment illustrated in FIG. 2 in that a transfer transistor M1 that transfers charge accumulated in the photoelectric conversion unit PD to the read node FD is provided instead of the first switch S1. The transfer transistor M1 is provided between the photoelectric conversion unit PD and the read node FD and is controlled according to a control signal TX output from the vertical scanning circuit 102. The other components are substantially the same as those of the first embodiment. In the following description, components different from those of the first embodiment will be described mainly.

Figure 5:
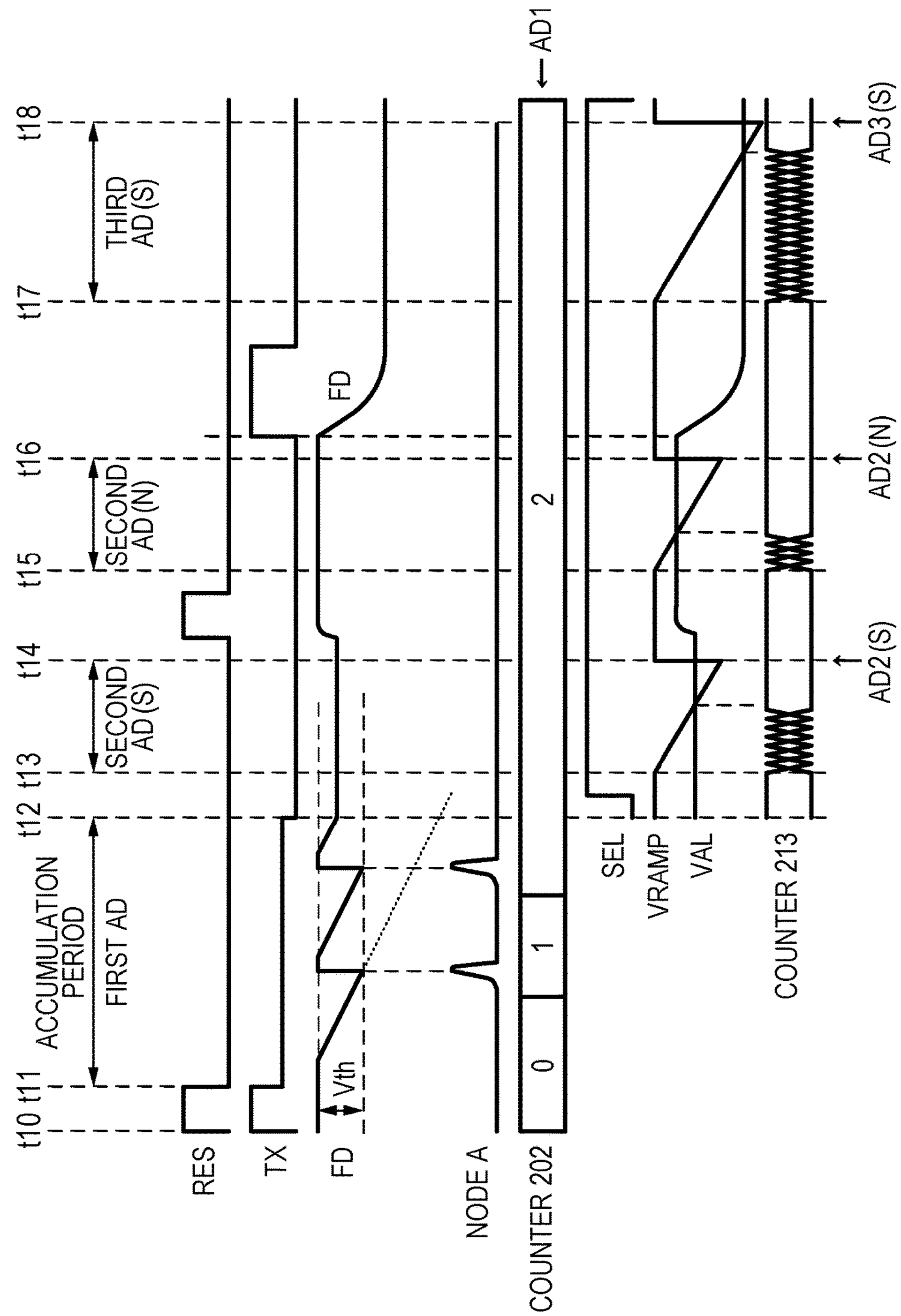
FIG. 5 is a timing chart illustrating a method of controlling the imaging device according to the second embodiment.

FIG. 5 is a timing chart illustrating a method of controlling the imaging device according to the second embodiment. The imaging device of the present embodiment is controlled according to control signals RES, TX, and SEL output from the vertical scanning circuit 102. At time t10, when the control signal RES and the control signal TX are changed to Hi, the reset transistor M4 and the transfer transistor M1 enter a conduction state and the signal charge of the read node FD and the photoelectric conversion unit PD is reset. As a result, a gate-drain voltage of the transistor M5 becomes 0 V. Current does not flow into the transistor M5 and the voltage of the node A between the transistor M5 and the first counter 202 is approximately 0 V.

At time t11, the control signal RES is changed to Lo and the control signal TX is changed to a predetermined intermediate voltage between Lo and Hi. Since the potential of the channel of the transfer transistor M1 is determined by the intermediate voltage of the control signal TX, when signal charge exceeding this potential is accumulated in the photoelectric conversion unit PD, the accumulated charge overflows from the photoelectric conversion unit PD to the read node FD. In this way, in an accumulation period t11 to t12, when the transfer control voltage of the transfer transistor M1 is changed to the intermediate voltage, the signal charge is transferred to the read node FD due to overflow and the voltage of the read node FD decreases as the amount of accumulated charge increases.

Subsequently, when the control signal TX is changed to Lo at time t12, the first AD conversion of the first readout circuit 201 ends. Subsequently, the second AD conversion operation of the second readout circuit 103 in the period until time t16 is performed. Since this operation is the same as the operation in the period until time t6 in FIG. 3, the description thereof will be omitted.

After the second AD conversion of the second readout circuit 103 ends, when the control signal TX is temporarily changed to Hi and is then returned to Lo in a period t16 to t17, the signal charge accumulated in the photoelectric conversion unit PD is completely transferred to the read node FD. In a period t17 to t18, the second comparator circuit 212 compares the voltage of the signal output to the analog output line VAL and the voltage of the reference signal VRAMP, whereby the third AD(S) conversion of the second readout circuit 103 is performed similarly to the first embodiment. In this way, the readout result AD3(S) of the third AD(S) conversion is obtained.

In this way, in the present embodiment, it is possible to AD-convert a signal component based on the signal charge additionally accumulated in the photoelectric conversion unit PD in the period t12 to t14 in which the control signal TX is changed to Lo and is then changed to Hi. The largest amplitude (a difference between maximum and minimum values) of the reference signal VRAMP in the third AD(S) conversion period t17 to t18 is preferably equal to or larger than the largest amplitude of the reference signal VRAMP in the second AD(S) conversion period t15 to t16.

Similarly to the first embodiment, the readout result AD2 of the second AD conversion is obtained by subtracting AD2(N) from AD2(S). Moreover, the readout result AD3 of the third AD conversion is obtained by subtracting AD2 (N) from AD3(S). Since AD2 (N) and AD3 (S) are correlated and subtraction of both results in a correlated double sampling (CDS) process, kTC noise occurring in the read node FD is not included in the readout result AD3, and the readout result AD3 has a smaller noise component than the readout result AD2. Particularly, charge does not overflow from the photoelectric conversion unit PD to the read node FD in the accumulation period t11 to t12, a photon shot noise component is not sufficiently larger than the kTC noise component, and an excellent effect in image quality improvement in light amount conditions equal to or lower than low to middle brightness.

The readout results AD1 to AD3 obtained by the first to third AD conversion operations are transferred to the signal processing unit 106 on the subsequent stage. The signal processing unit 106 calculates a final AD conversion value AD according to Equation (3) below.

$$AD=AD1\times AD1U+AD2+AD3 \tag{3}$$

As described above, the pixel of the present embodiment has a transfer transistor between the photoelectric conversion unit and the read node. Moreover, the second readout circuit performs the third AD conversion on the signal based on the charge transferred from the photoelectric conversion unit to the read node after the second AD conversion ends. Due to this, it is possible to improve the image quality in conditions equal to or lower than low to middle brightness particularly as compared to the first embodiment.

The transfer control voltage of the transfer transistor in the period in which the first AD conversion is performed may be an intermediate voltage between a second voltage (Lo) in the period in which the second AD conversion is performed and a third voltage (Hi) in the period in which the third AD conversion is performed. That is, a first voltage of the transfer transistor in the accumulation period t11 to t12 in which the first AD conversion is performed may be an intermediate voltage that satisfies Equation (4) below.

$$\text{Second Voltage}<\text{First Voltage}<\text{Third Voltage} \tag{4}$$

Third Embodiment

Figure 6:
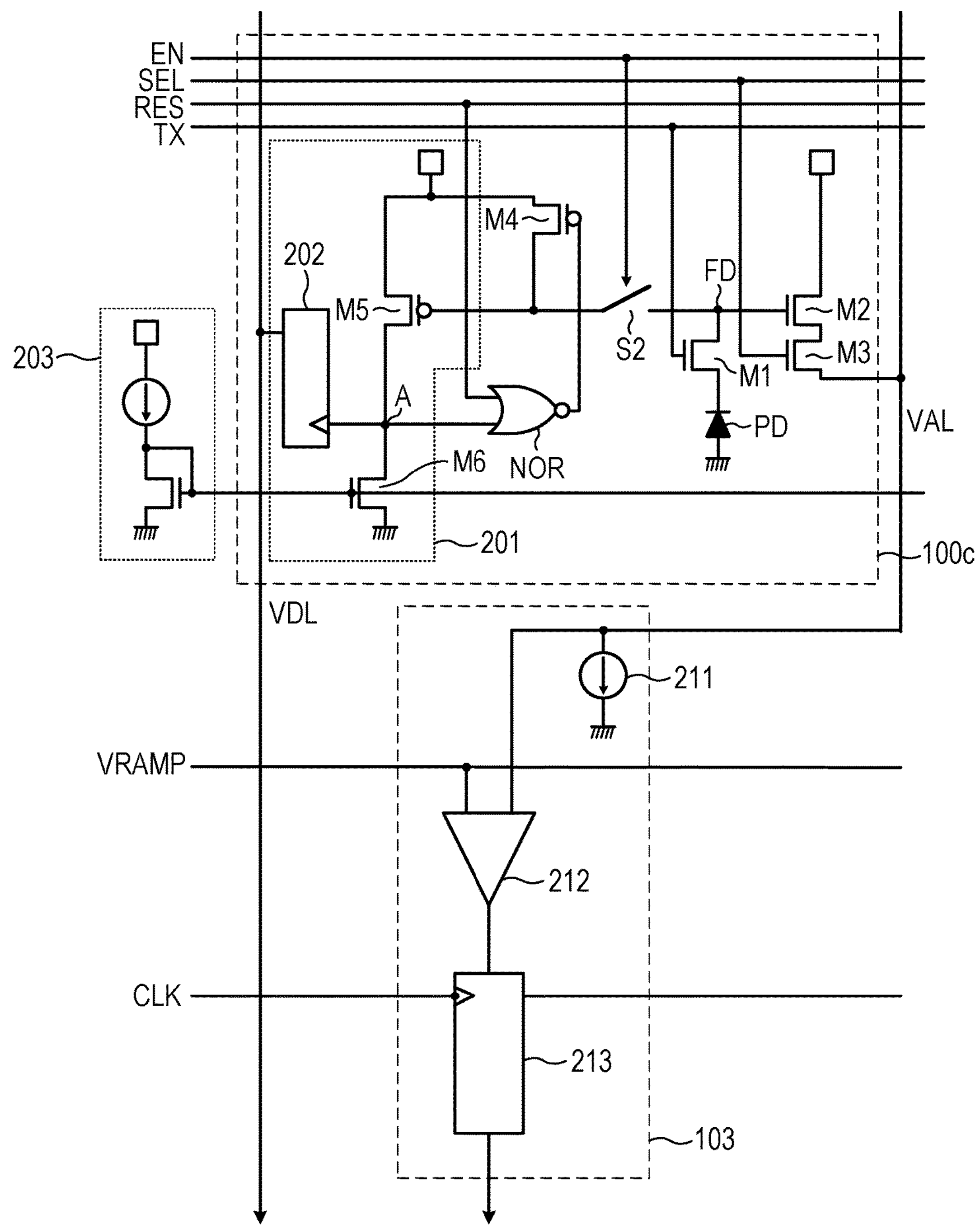
FIG. 6 is a schematic diagram illustrating a configuration of a pixel and a second readout circuit of an imaging device according to a third embodiment.

FIG. 6 is a schematic diagram illustrating a configuration of a pixel 100*c* and a second readout circuit 103 of an imaging device according to a third embodiment. The imaging device of the present embodiment illustrated in FIG. 6 is different from the imaging device of the second embodiment illustrated in FIG. 4 in that a second switch S2 is provided between the first readout circuit 201 and the read node FD. The second switch S2 is controlled according to a control signal EN output from the vertical scanning circuit 102. The other components are substantially the same as those of the second embodiment. In the following description, components different from those of the second embodiment will be described mainly.

Figure 7:
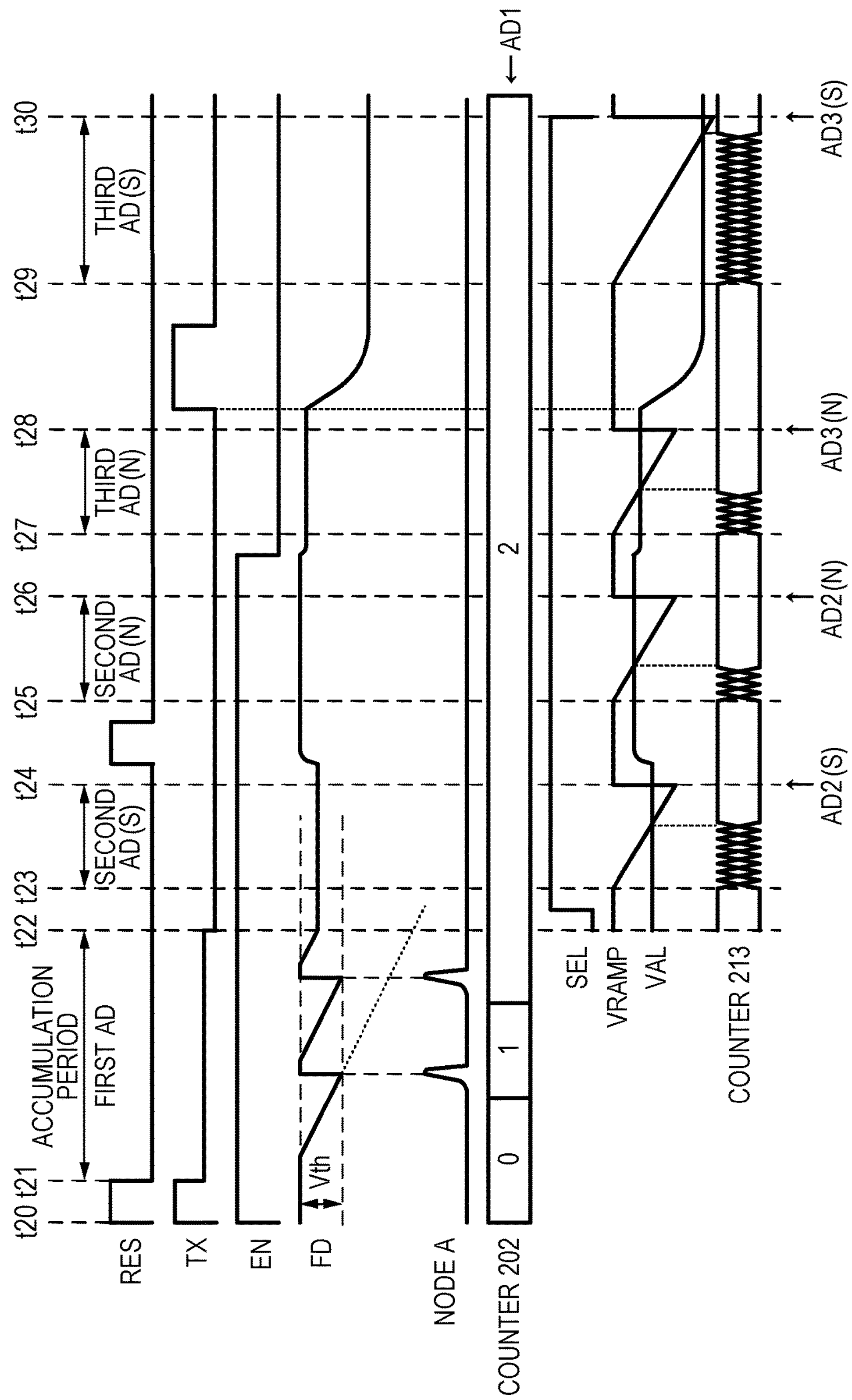
FIG. 7 is a timing chart illustrating a method of controlling the imaging device according to the third embodiment.

FIG. 7 is a timing chart illustrating a method of controlling the imaging device according to the third embodiment. The imaging device of the present embodiment is controlled according to control signals RES, TX, EN, and SEL output from the vertical scanning circuit 102. In a period t20 to t26 illustrated in FIG. 7, the control signal EN is Hi and the second switch S2 is in the conduction state. That is, since the circuit and the operation of the imaging device in the period t20 to t26 are the same as those of the second embodiment, the description thereof will be omitted.

After the second AD conversion of the second readout circuit 103 ends, when the control signal EN is changed to Lo in the period t26 to t27, the second switch S2 enters the non-conduction state. In this way, the floating capacitance of the read node FD on the readout transistor M2 decreases and the voltage of the read node FD varies due to the influence of charge injection or the like.

In a period t27 to t28, the varied voltage value of the read node FD is used as a second reset level, and the third AD conversion (N) of the second readout circuit 103 is performed similarly to the second AD conversion (N). Subsequently, in a period t28 to t29, the control signal TX is temporarily changed to Hi and is then returned to Lo, and the charge accumulated in the photoelectric conversion unit PD is transferred to the read node FD.

After that, the third AD conversion (S) of the second readout circuit 103 is performed similarly to the second embodiment. The readout result AD3 of the third AD conversion is obtained by subtracting the readout result AD3(N) of the third AD conversion (N) from the readout result AD3(S) of the third AD conversion (S). Since AD3(N) and AD3(S) are correlated, a CDS process is performed similarly to the second embodiment.

In this way, since the second switch S2 is in the non-conduction state in the period in which the third AD conversion is performed by the second readout circuit 103, the floating capacitance of the read node FD decreases, and the gain of conversion from the charge on the read node FD to a voltage increases further. That is, when a signal based on the signal charge transferred from the photoelectric conversion unit PD is read, input conversion noise in the read node FD decreases. Due to this, the image quality in light amount conditions equal to or lower than low to middle brightness particularly is improved further as compared to the second embodiment.

The readout results AD1 to AD3 obtained by the first to third AD conversion are transferred to the signal processing unit 106 on the subsequent stage. The signal processing unit 106 calculates a final AD conversion value AD according to Equation (5) below. Here, Ch indicates the floating capacitance of the read node FD when the second switch S2 is in the conduction state and Cl indicates the floating capacitance of the read node FD when the second switch S2 is in the non-conduction state.

$$AD = AD1 \times AD1U \times Ch/Cl + AD2 \times Ch/Cl + AD3 \quad (5)$$

As described above, the pixel of the present embodiment has the second switch between the first readout circuit and the read node. Moreover, during the period in which the third AD conversion is performed, the second switch is put into the non-conduction state to decrease the floating capacitance of the read node FD. Due to this, it is possible to improve the image quality in conditions equal to or lower than low to middle brightness particularly as compared to the second embodiment.

Fourth Embodiment

Figure 8:
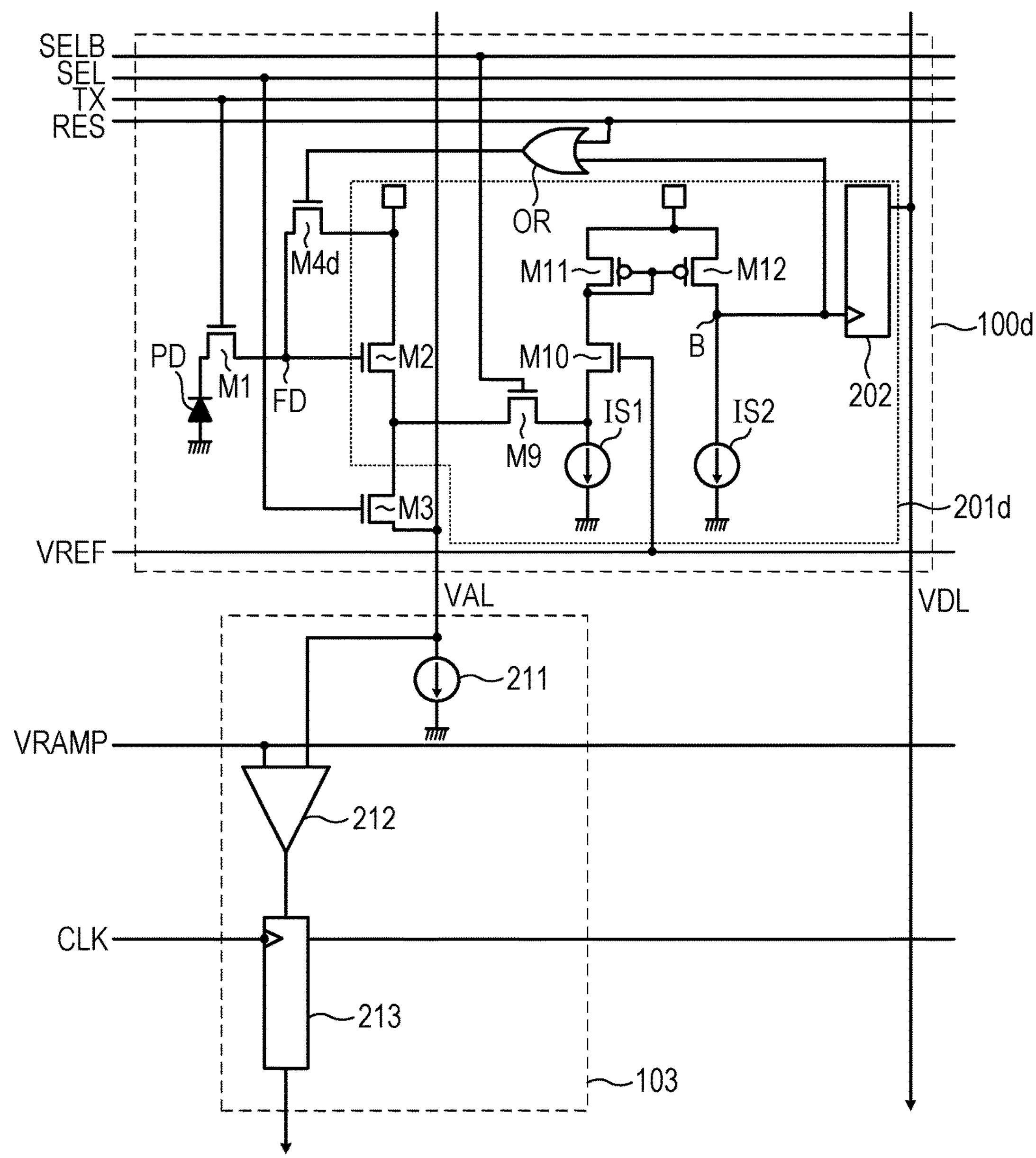
FIG. 8 is a schematic diagram illustrating a configuration of a pixel and a second readout circuit of an imaging device according to a fourth embodiment.

FIG. 8 is a schematic diagram illustrating a configuration of a pixel 100*d* and a second readout circuit 103 of an imaging device according to a fourth embodiment. The imaging device of the present embodiment illustrated in FIG. 8 is different from the imaging device of the second embodiment illustrated in FIG. 4 in that the first readout circuit 201, the second readout circuit 103, and the readout transistor M2 are shared. The other components are substantially the same as those of the second embodiment. In the following description, components different from those of the second embodiment will be described mainly.

The pixel 100*d* illustrated in FIG. 8 includes the photoelectric conversion unit PD, the transfer transistor M1, the readout transistor M2, the selection transistor M3, a reset transistor M4*d*, a logical sum gate OR, and a first readout circuit 201*d*. Moreover, the first readout circuit 201*d* includes a selection transistor M9, transistors M10 to M12, current sources IS1 and IS2, and the first counter 202.

The selection transistor M9 is controlled to enter a conduction or non-conduction state according to a control signal SELB which is an inversion signal of the control signal SEL. In the present embodiment, a structure formed of the readout transistor M2, the transistors M10 to M12, and the current sources IS1 and IS2 operates as a first differential pair comparator circuit. The first comparator circuit compares the magnitude relation of a reference voltage VREF and the voltage of the read node FD and inverts the voltage of an output node B when the magnitude relation is reversed. At the same time, the first comparator circuit resets the charge accumulated in the read node FD using the reset transistor M4*d*. A value corresponding to the threshold voltage Vth in the above-described embodiments is controlled according to the reference voltage VREF. A configuration in which a signal is read to the second readout circuit 103 via the readout transistor M2 and the selection transistor M3 is the same as that of the above-described embodiments.

Figure 9:
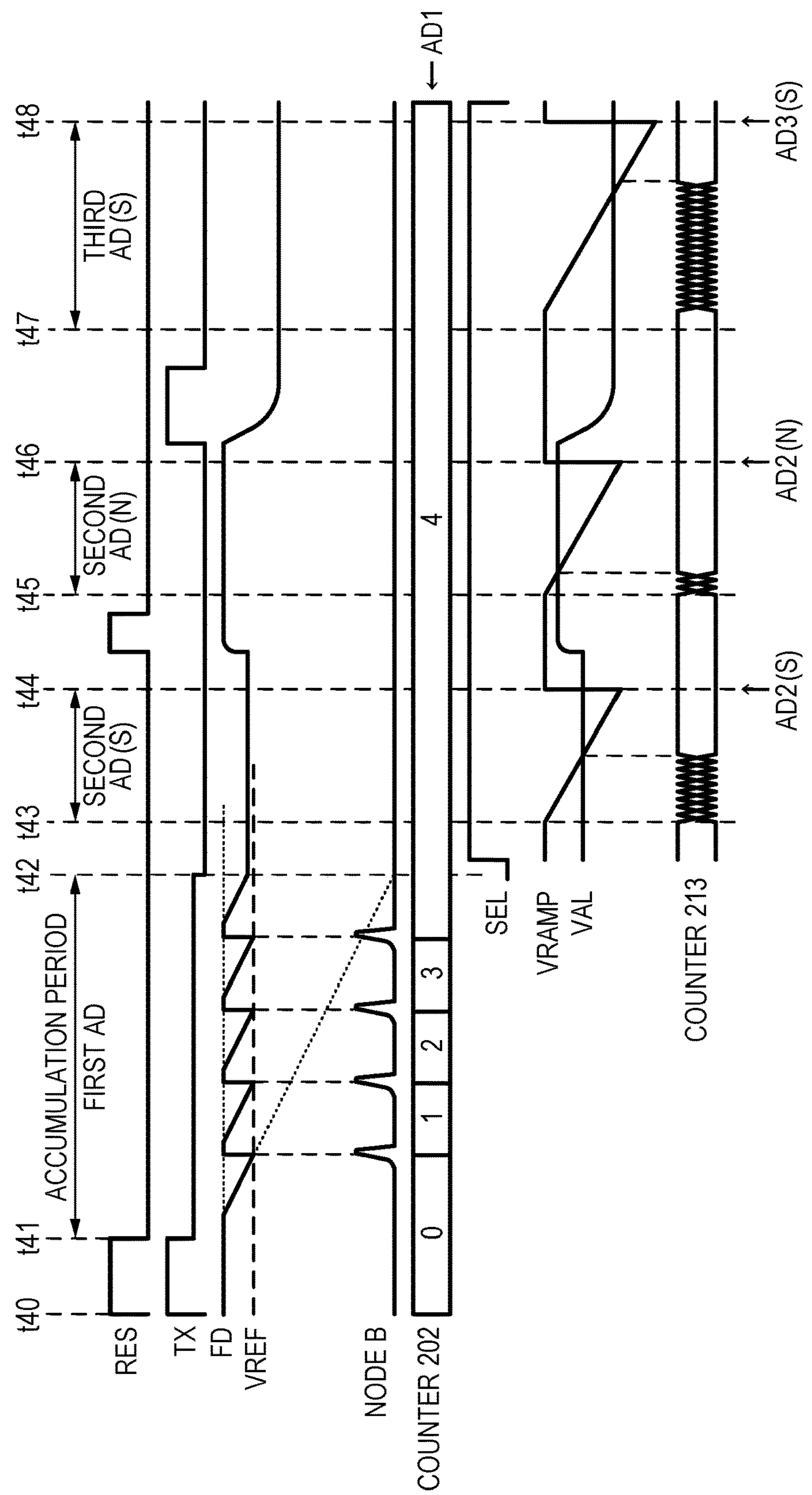
FIG. 9 is a timing chart illustrating a method of controlling the imaging device according to the fourth embodiment.

FIG. 9 is a timing chart illustrating a method of controlling the imaging device according to the fourth embodiment. The imaging device of the present embodiment is controlled according to control signals RES, TX, SEL, and SELB output from the vertical scanning circuit 102. At time t40 illustrated in FIG. 9, when the control signal RES and the control signal TX are changed to Hi, the signal charge of the read node FD and the photoelectric conversion unit PD is reset. After the signal charge is reset, the control signal TX is changed to an intermediate voltage similarly to the second embodiment, and accumulation starts.

In the accumulation period t41 to t42, when the signal charge starts overflowing from the photoelectric conversion unit PD to the read node FD, the voltage of the read node FD starts decreasing. When the voltage of the read node FD becomes equal to or lower than the reference voltage VREF, the voltage of the output node B is inverted. This inversion result is input to the reset transistor M4*d* via the logical sum gate OR and the read node FD is reset. After the reset, when the output node B returns to the initial state, the reset transistor M4*d* enters the non-conduction state and the accumulation restarts. The subsequent operations and processes are similar to those of the second embodiment, and the description thereof will be omitted.

As described above, in the pixel of the present embodiment, the readout transistor M2, the first readout circuit, and the second readout circuit are shared. Due to this, since the number of elements connected to the read node FD decreases and the floating capacitance of the read node FD decreases, noise components in low to middle brightness are reduced. Therefore, it is possible to improve the image quality in conditions equal to or lower than low to middle brightness particularly as compared to the second embodiment. Moreover, since the third AD conversion (N) process can be eliminated, it is possible to accelerate the third AD conversion as compared to the third embodiment.

Fifth Embodiment

Figure 10:
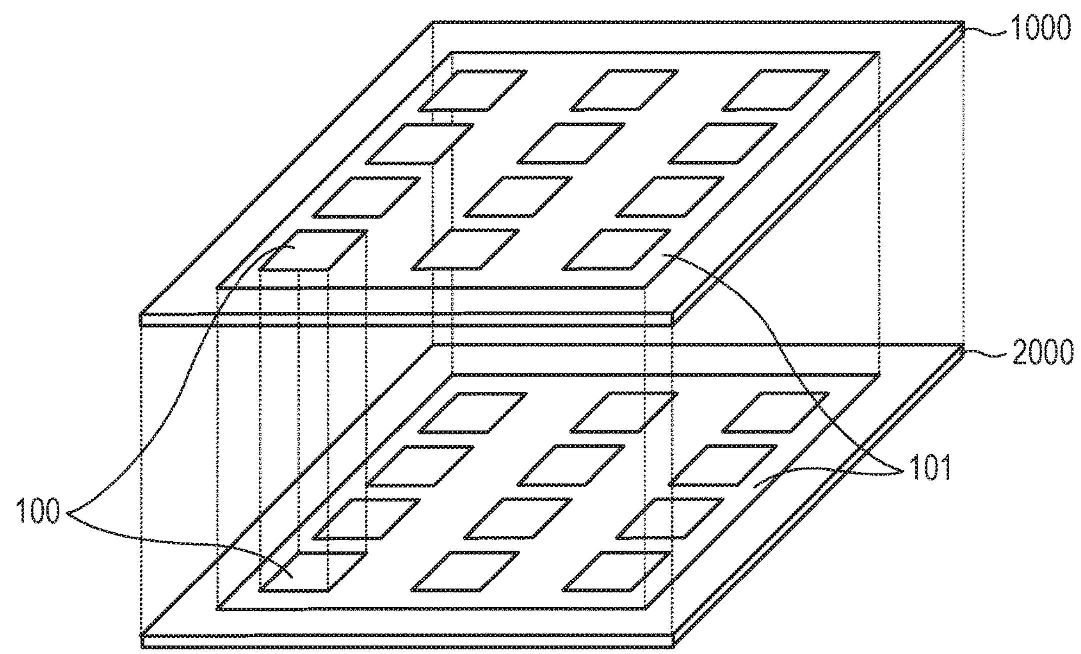
FIG. 10 is a schematic diagram illustrating a configuration of an imaging device according to a fifth embodiment.

FIG. 10 is a schematic diagram illustrating a configuration of an imaging device according to a fifth embodiment. The imaging device of the present embodiment includes a first semiconductor substrate 1000 and a second semiconductor substrate 2000. The respective components of the pixel 100 of the above-described embodiments are disposed in the first or second semiconductor substrate 1000 or 2000. In fact, the first semiconductor substrate 1000 and the second semiconductor substrate 2000 are stacked and the upper and lower structures are electrically connected by a connector (not illustrated) of each pixel.

The upper surface of the first semiconductor substrate 1000 illustrated in FIG. 10 is used as a light receiving surface. In this case, at least the photoelectric conversion unit PD, the readout transistor M2, and the selection transistor M3 are disposed in the first semiconductor substrate 1000. On the other hand, at least the first readout circuit 201 or 201*d* is disposed in the second semiconductor substrate 2000. The vertical scanning circuit 102, the second readout circuit 103, the reference signal generation circuit 104, the clock generation circuit 105, the signal processing unit 106, and the other components in the pixel may be disposed on any one of the semiconductor substrates.

Three or more semiconductor substrates may be stacked. In this case, at least the above-described components are disposed on the first semiconductor substrate 1000 which is a semiconductor substrate located on the uppermost layer when seen from the light receiving surface. The second readout circuit 103 is disposed in a semiconductor substrate on the middle layer, and the signal processing unit 106 is disposed in a semiconductor substrate on the lowermost layer. Alternatively, the first counter 202 that forms the second readout circuit 103 may also be disposed in the semiconductor substrate on the lowermost layer.

In the above-described embodiments, although the second readout circuit 103 is connected in common to a plurality of pixels on the same column, the present invention is not limited to this. When a plurality of semiconductor substrates are stacked as in the present embodiment, the second readout circuit 103 may be connected in common to a plurality of pixels in an arbitrary region. In this case, the respective operations described as row-sequential operations are dot-sequentially performed within each block according to arbitrary rules.

As described above, the imaging device of the present embodiment has a configuration in which a plurality of semiconductor substrates are stacked. The photoelectric conversion unit and the read node are formed in a semiconductor substrate on the uppermost layer when seen from the light receiving surface, and the first readout circuit is formed in a semiconductor substrate in a layer other than the uppermost layer. In this way, by arranging the components of the pixel in a plurality of semiconductor substrates in a distributed manner, it is possible to decrease the area per one pixel and to reduce a pixel pitch easily.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-222225, filed Nov. 15, 2016, which is hereby incorporated by reference herein in its entirety.

What is claimed is:

1. An imaging device comprising:

a plurality of pixels, each pixel including a photoelectric conversion unit that photoelectrically converts received light, a read node in which a signal charge generated in the photoelectric conversion unit is accumulated, and a first readout circuit that performs analog-to-digital conversion to convert a signal based on the signal charge accumulated in the read node into a digital signal; and a second readout circuit that reads a signal based on the signal charge, the signal having a smaller amplitude than a resolution of the analog-to-digital conversion of the first readout circuit.

2. The imaging device according to claim 1, wherein the first readout circuit includes:

a first comparator circuit that compares magnitudes of the signal based on the signal charge and a predetermined threshold voltage;

a first counter that counts the number of times an output of the first comparator circuit is inverted; and a reset unit that resets the signal charge accumulated in the read node when the output of the first comparator circuit is inverted.

3. The imaging device according to claim 2, wherein the second readout circuit includes:

a second comparator circuit that compares the signal based on the signal charge and a reference signal; and a second counter that measures a duration of a period elapsed until an output of the second comparator circuit is inverted.

4. The imaging device according to claim 3, wherein the reference signal is a ramp signal of which the magnitude changes with the elapse of time, and a largest amplitude thereof is equal to or larger than the threshold voltage.

5. The imaging device according to claim 3, wherein the second readout circuit is provided in common to a plurality of pixels.

6. The imaging device according to claim 3, wherein the first readout circuit performs a first readout operation in an accumulation period in which the signal charge generated in the photoelectric conversion unit is transferred to and accumulated in the read node, and the second readout circuit performs a second readout operation after the first readout operation ends.

7. The imaging device according to claim 6, wherein the pixel includes a first switch between the photoelectric conversion unit and the read node, and the first switch is in a conduction state in a period in which the first readout operation is performed and is in a non-conduction state in a period in which the second readout operation is performed.

8. The imaging device according to claim 7, wherein the first switch is a transfer transistor, a transfer control voltage of the transfer transistor is changed to a first voltage in a period in which the first readout operation is performed and is changed to a second voltage in a period in which the second readout operation is performed, after the second readout operation is performed, the transfer control voltage is changed to a third voltage and the transfer transistor enters a conduction state, after the signal charge of the photoelectric conversion unit is transferred to the read node, the transfer control voltage is changed to the second voltage and the transfer transistor enters a non-conduction state, the second voltage is smaller than the first voltage which is smaller than the third voltage, and after the transfer control voltage of the transfer transistor is changed to the third voltage, the second readout circuit performs a third readout operation.

9. The imaging device according to claim 8, wherein the reference signal is a ramp signal of which the magnitude changes with the elapse of time, and a largest amplitude during the third readout operation is equal to or larger than a largest amplitude during the second readout operation.

10. The imaging device according to claim 8, wherein the pixel includes a second switch between the first readout circuit and the read node, and the second switch is in a conduction state in a period in which the first and/or second readout operation is performed and is in a non-conduction state in a period in which the third readout operation is performed.

11. The imaging device according to claim 6, further comprising:

a signal processing unit that calculates an AD conversion value AD according to the following equation using a readout result AD1 of the first readout operation, a readout result AD2 of the second readout operation, and a readout result AD1U of the threshold voltage by the second readout circuit.

$$AD=AD1\times AD1U+AD2$$

12. The imaging device according to claim 8, further comprising:

a signal processing unit that calculates an AD conversion value AD according to the following equation using a readout result AD1 of the first readout operation, a readout result AD2 of the second readout operation, a readout result AD3 of the third readout operation, and a readout result AD1U of the threshold voltage by the second readout circuit.

$$AD=AD1\times AD1U+AD2+AD3$$

13. The imaging device according to claim 10, further comprising:

a signal processing unit that calculates an AD conversion value AD according to the following equation using a floating capacitance Ch of the read node when the second switch is in a conduction state, a floating capacitance Cl of the read node when the second switch is in a non-conduction state, a readout result AD1 of the first readout operation, a readout result AD2 of the second readout operation, a readout result AD3 of the third readout operation, and a readout result AD1U of the threshold voltage by the second readout circuit.

$$AD=AD1\times AD1U\times Ch/Cl+AD2\times Ch/Cl+AD3$$

14. The imaging device according to claim 6, wherein a readout result AD1 of the first readout operation is corrected according to the following equation using the duration Tacc of the accumulation period and the duration Tres of a reset period in one accumulation period.

$$AD1'=AD1\times Tacc/(Tacc-Tres=AD1)$$

15. The imaging device according to claim 1, wherein a readout transistor connected to the read node is shared by the first readout circuit and the second readout circuit.

16. The imaging device according to claim 1, wherein a plurality of semiconductor substrates are stacked, the photoelectric conversion unit and the read node are formed in the semiconductor substrate on an uppermost layer when seen from a light receiving surface, and the first readout circuit is formed in the semiconductor substrate in a layer other than the uppermost layer.

* * * * *